(12) United States Patent
Metcalfe

(10) Patent No.: US 7,556,057 B2
(45) Date of Patent: Jul. 7, 2009

(54) GAS PRESSURE REGULATOR

(75) Inventor: Steven Metcalfe, Cambridge (CA)

(73) Assignee: D & S Product Solutions Inc., Lively, Ontario (CA)

( * ) Notice: Subject to any disclaimer, the term of this patent is extended or adjusted under 35 U.S.C. 154(b) by 140 days.

(21) Appl. No.: 11/510,841

(22) Filed: Aug. 28, 2006

(65) Prior Publication Data

US 2007/0044844 A1    Mar. 1, 2007

(30) Foreign Application Priority Data

Aug. 29, 2005 (CA) .................................. 2,517,466
Sep. 29, 2005 (CA) .................................. 2,521,699

(51) Int. Cl.
*G05D 16/02* (2006.01)
(52) U.S. Cl. .................................. 137/505.37; 137/505
(58) Field of Classification Search .................. 137/505, 137/505.35–505.37, 505.41, 505.42, 505.25; 251/335.2, 120

See application file for complete search history.

(56) References Cited

U.S. PATENT DOCUMENTS

| | | | | |
|---|---|---|---|---|
| 2,591,407 | A * | 4/1952 | Cornelius | 137/505.41 |
| 5,875,815 | A * | 3/1999 | Ungerecht et al. | 137/505.25 |
| 6,062,258 | A | 5/2000 | Diehl | |
| 6,158,457 | A * | 12/2000 | Byrd et al. | 137/505.25 |
| 6,782,871 | B2 * | 8/2004 | McIntyre et al. | 137/505.25 |
| 6,932,128 | B2 | 8/2005 | Turan, Jr. | |
| 2004/0000343 | A1 | 1/2004 | Turan, Jr. | |

* cited by examiner

*Primary Examiner*—Stephen M Hepperle
(74) *Attorney, Agent, or Firm*—Dimock Stratton LLP

(57) ABSTRACT

A pressure regulator for dispensing $CO_2$ gas from a pressurized cylinder which has a reduced probability of freezing when liquid carbon dioxide is converted to the gaseous phase. A plunger which is configured to increase the length of the gas flow path between the regulator inlet and the regulator outlet, and thus to allow liquid $CO_2$ more time to convert to a gas before egressing from the regulator. In the preferred embodiment orifices are provided through the plunger head and spaces are provided about the periphery of the plunger head, which allow the $CO_2$ liquid to flow from the underside of the plunger through the plunger head, over the top of the plunger and about the side of the plunger head before egressing through the regulator outlet.

12 Claims, 4 Drawing Sheets

GAS PRESSURE REGULATOR

FIELD OF THE INVENTION

This invention relates to pressure regulators. In particular, this invention relates to a pressure regulator which has a reduced probability of freezing when regulating the dispensing of gaseous carbon dioxide or other gases that tend to freeze when dispensed.

BACKGROUND OF THE INVENTION

Many different types of products utilize compressed gas. In some cases compressed gas may be used to actuate equipment, for example pneumatic hand tools. In other cases compressed gas is used to alter a product, for example compressed carbon dioxide ($CO_2$) is used to carbonate soft drinks. In these cases the gas is supplied from a pressurized canister or cylinder.

Gas from a canister can also be used to drive a tool, for example the nail driver described in copending application Ser. No. 10/846,547 filed May 17, 2004 by Patrick, which is incorporated herein by reference. Typically such an application would utilize gas pressurized by a compressor, which is supplied at a relatively high pressure. In this type of application carbon dioxide ($CO_2$) can advantageously be used because in its gaseous state carbon dioxide is non-flammable, colourless and odourless, and can be supplied at the high pressures needed to drive a pneumatic tool. Carbon dioxide ($CO_2$) is unusual, however, because it solidifies directly from its gaseous state at $-109°$ F. ($-70°$ C.) at atmospheric pressure.

Carbon dioxide can be supplied as a gas from an external source to a sealed enclosure, from the solid phase (colloquially known as "dry ice"), but is normally supplied from the liquid phase. Liquid $CO_2$ cannot exist unless it is colder than $87.4°$ F. ($30.8°$ C.) and under a pressure of at least 60.4 psig. Conditions in liquid $CO_2$ tanks are usually about $0°$ F. ($-18°$ C.) and 126 psig. Liquid $CO_2$ is stored in pressurized cylinders, and changes to a gas when released from the cylinder, producing 0.5 cubic meters of gas per kilogram of liquid $CO_2$.

As is typical of compressed gas applications, the rate of release of $CO_2$ gas from a pressurized $CO_2$ cylinder is controlled by a regulator. However, because of the unique properties of carbon dioxide, as liquid $CO_2$ turns into gas it cools drastically as the pressure of the $CO_2$ is reduced across the regulator. This cooling can be so severe as to freeze the regulator orifices, restricting or in the worst case stopping the gas flow. Thus, carbon dioxide frequently causes ordinary regulators to become blocked with solid phase $CO_2$, due to the dramatic cooling effect that occurs when the gas pressure is reduced as it is dispensed.

Electrically heated regulators have been employed successfully to keep the $CO_2$ gas and the regulator from freezing. However, this solution requires electrical power, which involves additional cost and limits the environments in which the regulator can be used.

It would accordingly be advantageous to have a $CO_2$ pressure regulator that does not freeze when $CO_2$ gas is released, without requiring the application of heat from an external source.

SUMMARY OF THE INVENTION

The present invention provides a $CO_2$ regulator which regulates a flow of $CO_2$ from a gas cylinder without freezing. The invention accomplishes this by providing a plunger which is configured to increase the length of the gas flow path between the regulator inlet and the regulator outlet, and thus to allow liquid $CO_2$ more time to convert to a gas before egressing from the regulator.

In the preferred embodiment this is accomplished by providing orifices through the plunger head and spaces about the periphery of the plunger head, which allow the $CO_2$ liquid to flow from the underside of the plunger through the plunger head, over the top of the plunger and about the side of the plunger head before egressing through the regulator outlet.

BRIEF DESCRIPTION OF THE DRAWINGS

In drawings which illustrate by way of example only a preferred embodiment of the invention.

DETAILED DESCRIPTION OF THE INVENTION

Figure 1:
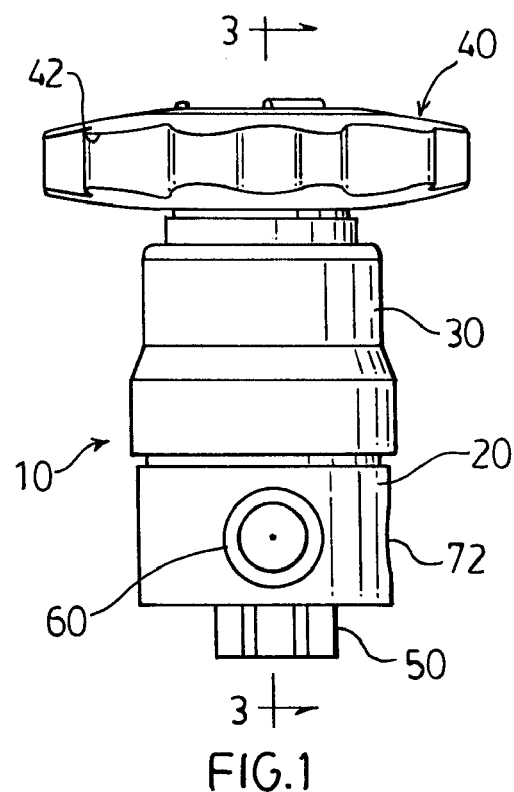
FIG. 1 is a front elevational view of the gas pressure regulator.

FIG. 1 illustrates a preferred embodiment of a pressure regulator according to the invention. The pressure regulator is most advantageously used to regulate the pressure of carbon dioxide released from a cylinder, however, it will be appreciated that the invention can also be used beneficially with gases that have similar physical properties to carbon dioxide, such as nitrous oxide. The pressure regulator of the invention can be used in conjunction with a $CO_2$ cylinder to drive a tool, for example the pneumatic nail driver described in copending application Ser. No. 10/846,547 filed May 17, 2004 by Patrick, which is incorporated herein by reference, or other types of pneumatic tools including crown staplers, pin nailers, roofing nailers, grease guns and caulking guns.

Figure 2:
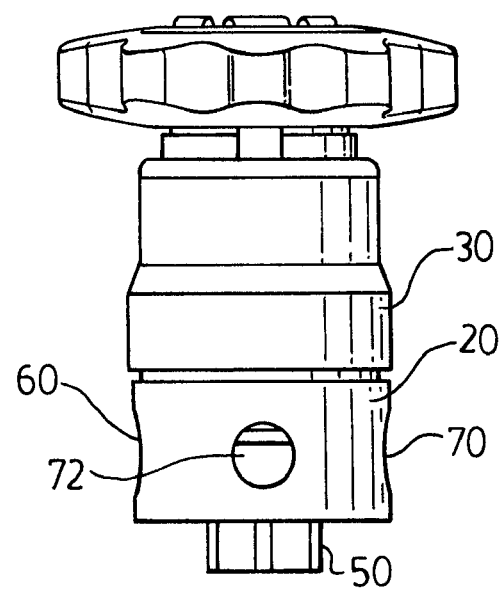
FIG. 2 is a side elevational view of the gas pressure regulator shown in FIG. 1.

As shown in FIG. 1, the pressure regulator 10 comprises a valve housing 20, a diaphragm housing 30, an actuator comprising a pressure adjust knob 40, and a needle cap 50. The valve housing 20 and diaphragm housing 30 make up the regulator body, and may be cast from aluminum or, for heavy duty applications, a copper alloy. The valve housing 20 includes a plurality of threaded orifices allowing for the flow of carbon dioxide in and out of the pressure regulator 10, and a valve member 22 which seals against the plunger 80 in the manner described below. The plurality of orifices comprises an inlet 60 disposed to receive carbon dioxide, such as from a pressurized $CO_2$ cylinder, and at least one gas supply outlet 70, best seen in FIG. 3, to which an outlet coupler is affixed to provide carbon dioxide to an attached pneumatic device. A third orifice 72 (shown in FIGS. 2 and 4) is provided for coupling to the valve housing 20 a pressure gauge (not shown) for indicating the gas supply pressure. The inlet 60 is preferably larger than the gas supply outlet 70.

The pressure adjust knob 40 includes a moulded handle 42 and a cylindrical body 44 which has a bottom end that is threadedly engaged to the diaphragm housing 30 so as to move axially up and down when rotated about its axis. The pressure adjust knob 40 is engaged by a knob retainer ring 210, preferably made of galvanized spring steel.

A pressure adjust spring assembly is lodged in the diaphragm housing 30 and comprises a spring seat 102 and a pressure adjust spring 104 bearing against a diaphragm plunger plate 110. The diaphragm 106, which is elastomeric and preferably made of rubber, is retained in the diaphragm housing 30 by a diaphragm ring 108, preferably made of brass or aluminum. The outer end of the diaphragm spring 104 thus exerts a force on diaphragm plate 110 which in turn bears against the flexible diaphragm 106. Also in contact with the top face of the flexible diaphragm 106 is the diaphragm ring 108.

Figure 3:
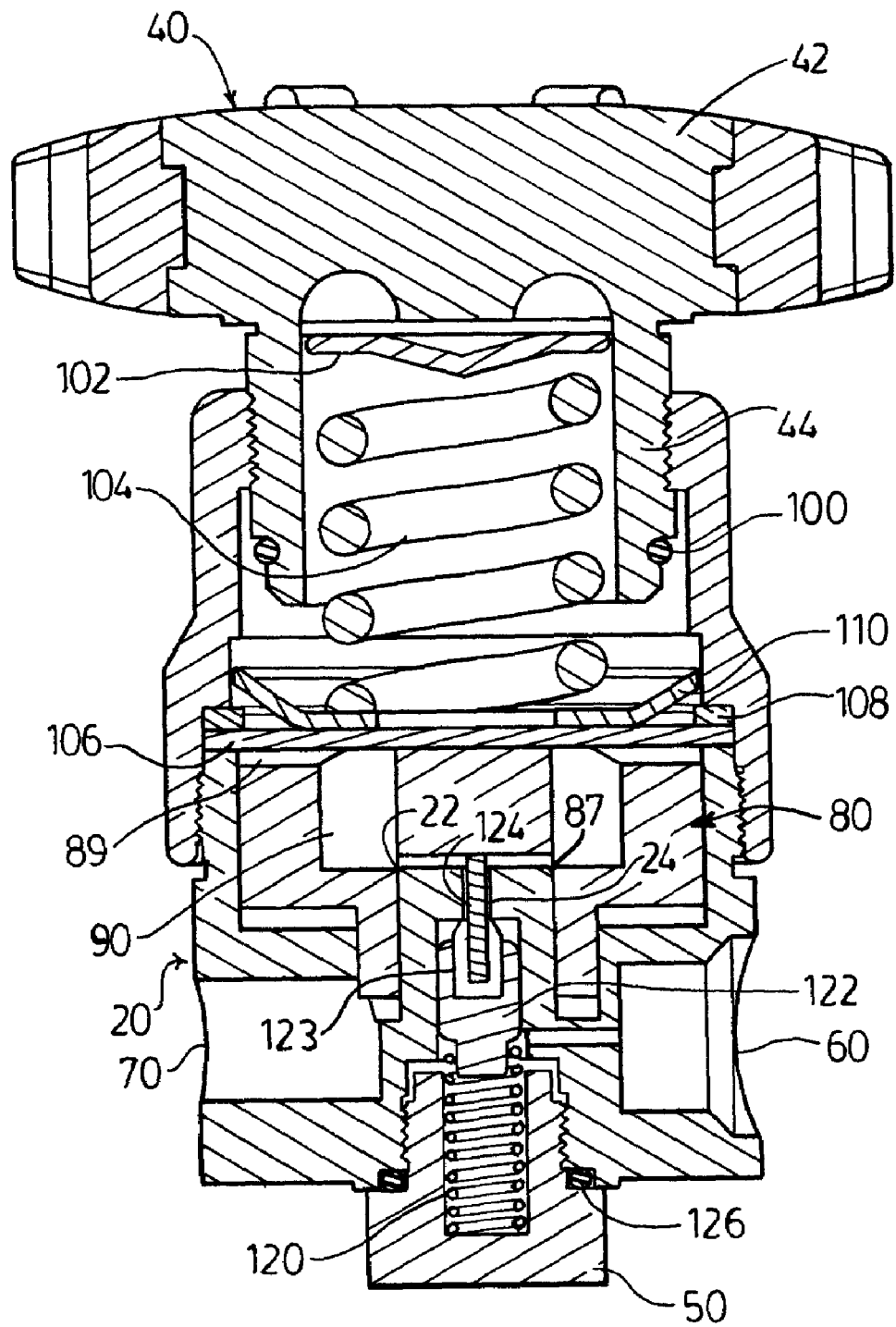
FIG. 3 is a cross-sectional view of the gas pressure regulator taken along the line 3-3 of FIG. 1.

FIG. 3 illustrates the valve assembly within the regulator body, including a plunger 80 disposed within the valve housing 20 and coacting with the flexible diaphragm 106. The plunger 80 is positioned adjacent to the flexible diaphragm 106 in a valve chamber 444 interconnecting the inlet 60 and the outlet (or outlets) 70. The opposite face of the diaphragm 106 is supported by the rigid (preferably steel) annular back plate 110 against which the pressure adjust spring 104 bears. Thus, by turning the pressure adjust knob 40, the force of the spring 104 against the backing plate 110 can be adjusted to allow the diaphragm 106 to yield more or less under the pressure of gas forced into the inlet 60, and to thus respectively increase or decrease the flow of carbon dioxide through the pressure regulator 10 in the manner described below.

Figure 5:
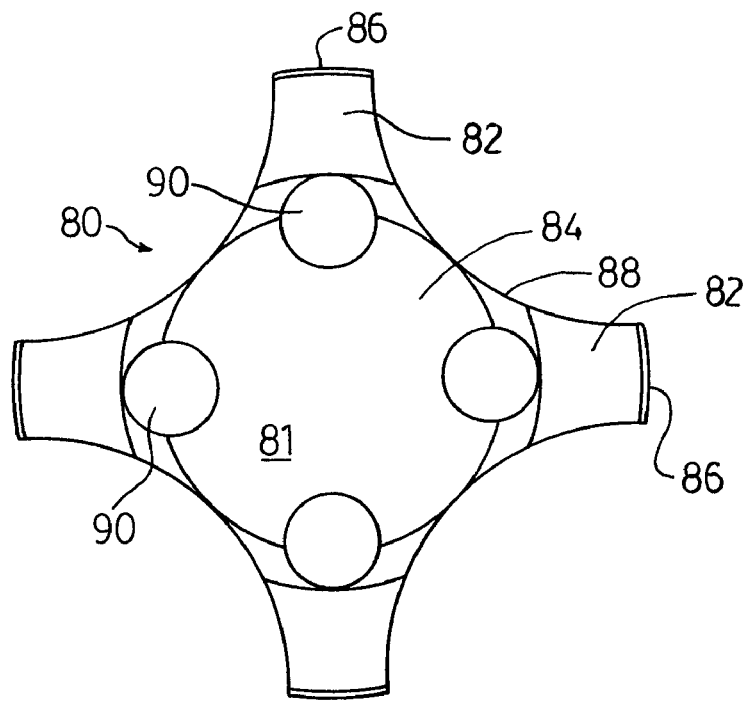
FIG. 5 is a top plan view of the plunger.
Figure 6:
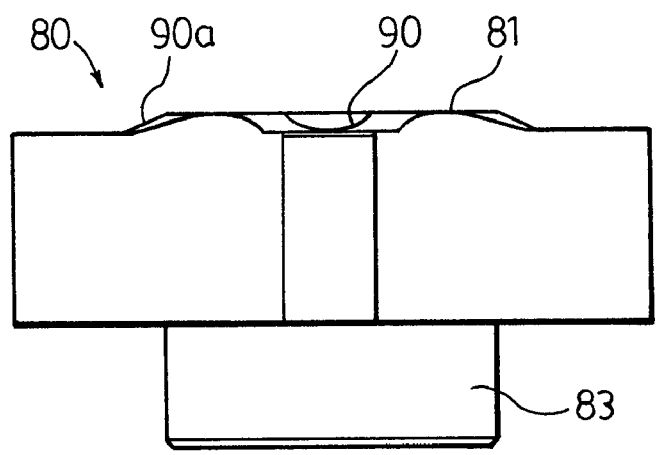
FIG. 6 is a side view of the plunger shown in FIG. 5.

In the preferred embodiment the plunger 80, shown in FIGS. 5 and 6, comprises a body portion 84 having an axially-extending neck 83 and radially-extending protrusions 82 generally evenly spaced about the body 84. The outer peripheries of the protrusions 82 fit closely with the valve housing 20 of the regulator body, to maintain the plunger 80 radially stable relative to the cylindrical interior of the valve housing 20 while allowing the plunger 80 to slide axially within the valve housing 20, and the outer peripheries of the protrusions 82 may be lined with a low friction material 86, such as Teflon (trademark), to facilitate axial movement of the plunger 80 within the valve housing 20. The spaces between protrusions 82 (in the embodiment shown defined by arcuate joining surfaces 88) allow gas to flow about the sides of the plunger 80.

Figure 4:
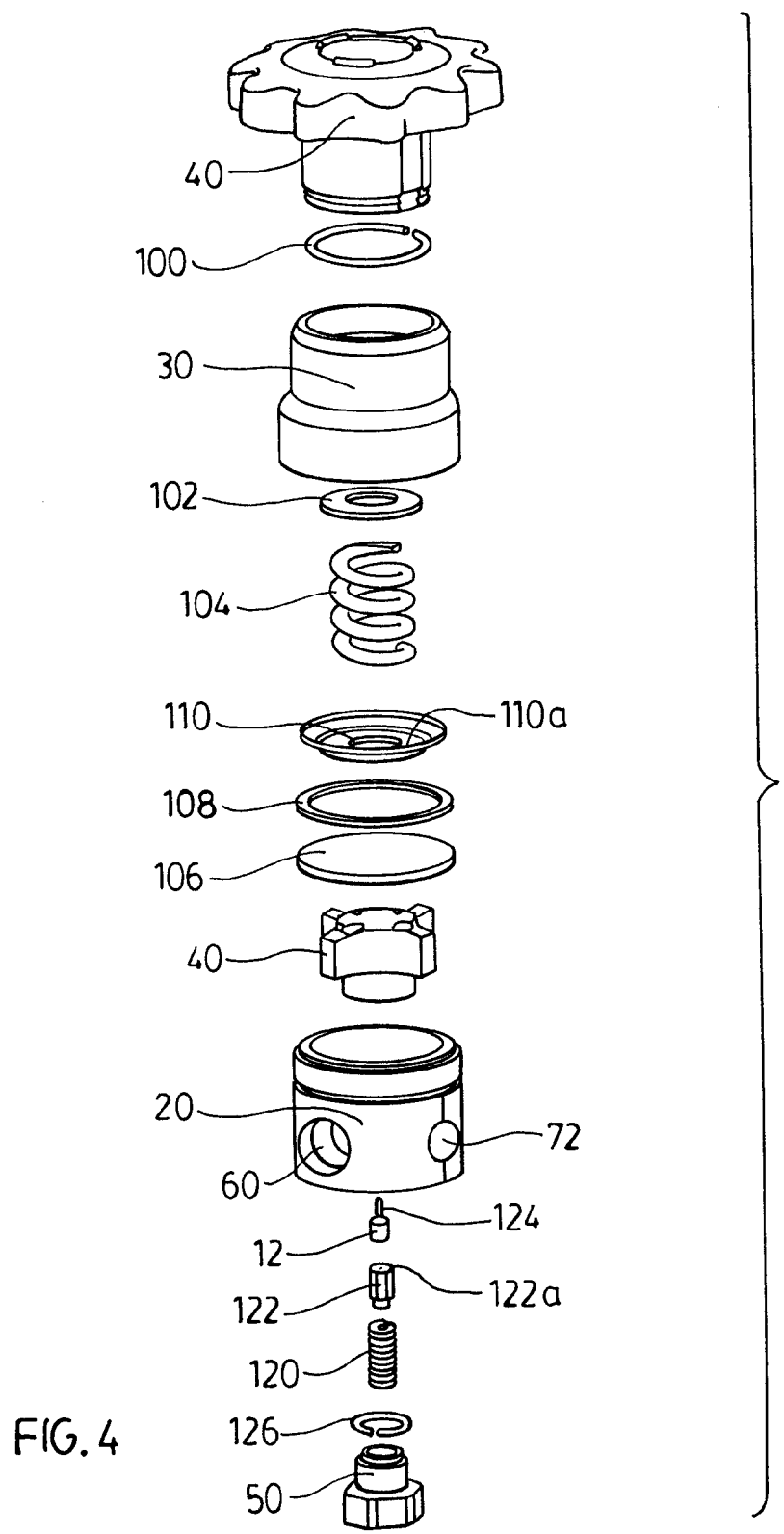
FIG. 4 is an exploded view of the gas pressure regulator of FIG. 1.

At least one, and preferably a plurality of orifices 90, best seen in FIG. 5, are disposed through the head of the plunger 80. The orifices 90 allow gas to escape through the plunger 80. As can be seen in FIGS. 4 and 6, the abutting face 81 of the plunger is raised about the body 84, such that at least a portion of each orifice opening along the abutting surface 81 is disposed at an acute angle relative to the diaphragm 106, as at 90a, and gas is thus able to flow through the orifices 90 and into the clearance 89 left between the protrusions 82 and the diaphragm 106, even when the pressure regulator 10 is fully closed. In the embodiment shown, the portion of each orifice opening disposed at an acute angle faces the direction of the protrusions 82.

A force opposing the force of the pressure adjust spring 104 is exerted on the valve assembly by a needle spring assembly comprising a needle spring 120, a needle housing 122 and a needle 124. One end of the needle spring 120 engages the needle housing 122, which partially encloses the needle 124 but includes a passage 122a that allows gas to flow from the inlet 60 through bore 60a and through needle passage 24 to the valve member 22. The needle 124 and needle housing 122 are preferably composed of stainless steel, and the needle 124 is mounted in an elastomeric (e.g. rubber) holder 123 which retains the needle 124 in the needle housing 122. The needle 124 engages the valve seat surface 87 of the plunger 80, contained within the plunger body 84 opposite the abutting face 81. The other end of the needle spring 120 engages the needle cap 50 mounted to the valve housing 20. A rubber O-ring 126 surrounds the inside opening of the needle cap 50, which is preferably made of aluminum, to prevent the escape of gas.

The needle spring 120, which is preferably a compression spring made of spring steel, thus exerts a biasing force in opposition to the biasing force of the pressure adjust spring 104 such that when the pressure adjust knob 40 is turned so as to raise the valve assembly, the needle spring 120 decompresses and flexes the diaphragm 106 through the opening 260a in annular back plate 110, which decreases the blockage by the plunger 80 of the inlet 60 and each outlet 70. Conversely, the needle spring 120 compresses when the pressure adjust knob 40 is turned into the diaphragm housing 30 to flatten out the diaphragm 106 and force the valve closed, as described below.

In operation, when the pressure regulator 10 is in the fully closed position, with the pressure adjust knob 40 fully screwed into the diaphragm housing 30, the pressure adjust spring forces the backing plate 110 against the diaphragm 106, which in turn forces the plunger 80 toward the needle 124, overcoming the force of needle spring 120 and forcing valve seat surface 87 against valve member 22 of the valve housing 20. This closes off the communication between inlet 60 and supply outlet 70, preventing the egress of gas from the regulator 10.

As the pressure adjust knob 40 is turned out of the diaphragm housing 30, the force is gradually released from the backing plate 110, allowing the diaphragm 106 to flex into the opening 110a in the annular backing plate 110. The diaphragm 106 20 remains held securely in place about its periphery by retaining ring 108, but the plunger 80 is forced toward the pressure adjust spring 104 by needle spring 120 acting on the needle 124 through the needle housing 122. This causes the valve seat 87 to move away from the valve member 22, allowing gas to flow from the needle passage 24 into the orifices 90 of the plunger.

The liquid $CO_2$, evaporating as it passes through the regulator 10, flows through the orifices 90, out of the angled orifice openings 90a and over the abutting surface 81 of the plunger 82. The $CO_2$ continues on its flow path around the plunger 80, flowing through the spaces defined between the arcuate surfaces 88 and the interior of the valve housing 20, and finally reaching the $CO_2$ outlet (or outlets) 70, from which the $CO_2$ gas egresses from the regulator 10. The gas flow path between the $CO_2$ inlet 60 and the $CO_2$ outlet 70 is thus long and allows the liquid $CO_2$ a considerable time to convert to the gaseous phase before egressing from the regulator 10.

The pressure regulator 10 thus controls the flow of $CO_2$ from a higher pressure container to a tool or other $CO_2$-driven device, maintaining a substantially constant pressure within the pressure regulator 10 and allowing the liquid $CO_2$ from the supply cylinder ample time to convert to the gaseous phase in the regulator 10.

Various embodiments of the present invention having been thus described in detail by way of example, it will be apparent to those skilled in the art that variations and modifications may be made without departing from the invention, as defined by the appended claims. Although the exemplary embodiment has been described in the context of a $CO_2$ regulator for driving a $CO_2$-driven device, in which the invention may be advantageously employed, those skilled in the art will appreciate that the invention is not so limited and can be employed for other purposes and using different gases.

What is claimed is:

1. A pressure regulator, comprising
  a body comprising a valve housing comprising an inlet in communication with at least one outlet through a valve chamber, and a diaphragm housing sealed from the valve housing, containing a flexible diaphragm and an actuator for applying a force to the diaphragm to move the diaphragm between a closed position and a plurality of open positions, a valve assembly disposed in the valve chamber and movable between the closed position, blocking communication between the inlet and the outlet, and the plurality of open positions allowing communication between the inlet and the outlet, and a plunger for actuating the valve assembly, mounted in the valve housing for axial movement between the open and closed positions responsive to movement of the diaphragm by the actuator, the plunger being interposed between the valve chamber and the outlet and being provided with a plurality of generally evenly-spaced orifices for allowing gas to flow through the plunger, a body portion of the plunger comprising radially-extending protrusions generally evenly spaced about the body and defining peripheral spaces for allowing gas to flow around a periphery of the plunger, whereby when the regulator is in the open position gas must flow through the valve chamber, through the plunger, around the plunger and through the outlet before egressing from the regulator.

2. The pressure regulator of claim 1, wherein the peripheral spaces between protrusions are defined by arcuate joining surfaces.

3. The pressure regulator of claim 1, wherein the orifices are generally aligned with the protrusions.

4. The pressure regulator of claim 1, wherein at least a portion of each orifice opening along an abutting surface of the plunger for abutting the diaphragm is disposed at an acute angle relative to the diaphragm, allowing gas to flow through the orifices and into a clearance between the abutting surface and the diaphragm when the pressure regulator is fully closed.

5. The pressure regulator of claim 4, wherein the portion of each orifice opening is disposed at an acute angle faces a direction of the protrusions.

6. The pressure regulator of claim 1, wherein an outer periphery of each protrusion is lined with a low friction material.

7. A plunger for a pressure regulator, having a body comprising a valve housing comprising an inlet in communication with at least one outlet through a valve chamber and a diaphragm housing sealed from the valve housing, containing a flexible diaphragm and an actuator for applying a force to the diaphragm to move the diaphragm between a closed position and a plurality of open positions, and a valve assembly disposed in the valve chamber and movable between the closed position, blocking communication between the inlet and the outlet, and the plurality of open positions allowing communication between the inlet and the outlet, the plunger being mounted in the valve housing interposed between the valve chamber and the outlet, for axial movement between the open and closed positions responsive to movement of the diaphragm by the actuator, the plunger being interposed between the valve chamber and the outlet and being provided with a plurality of generally evenly-spaced orifices for allowing gas to flow through the plunger, a body portion of the plunger comprising radially- extending protrusions generally evenly spaced about the body and defining peripheral spaces for allowing gas to flow around a periphery of the plunger, whereby when the regulator is in the open position gas must flow through the valve chamber, through the plunger, around the plunger and through the outlet before egressing from the regulator.

8. The plunger of claim 7, wherein the peripheral spaces between protrusions are defined by arcuate joining surfaces.

9. The plunger of claim 7, wherein the orifices are generally aligned with the protrusions.

10. The plunger of claim 7, wherein at least a portion of each orifice opening along an abutting surface of the plunger for abutting a diaphragm is disposed at an acute angle relative to the diaphragm, allowing gas to flow through the orifices and into a clearance between the abutting surface and the diaphragm when the pressure regulator is frilly closed.

11. The plunger of claim 10, wherein the portion of each orifice opening is disposed at an acute angle faces a direction of the protrusions.

12. The plunger of claim 7, wherein an outer periphery of each protrusion is lined with a low friction material.

* * * * *